(12) United States Patent
Hamaguchi et al.

(10) Patent No.: US 12,391,243 B2
(45) Date of Patent: Aug. 19, 2025

(54) CONTROL DEVICE FOR VEHICLE AND CONTROL METHOD FOR VEHICLE

(71) Applicant: TOYOTA JIDOSHA KABUSHIKI KAISHA, Toyota (JP)

(72) Inventors: Takeshi Hamaguchi, Seto (JP); Shintaro Saigo, Nisshin (JP); Shusaku Sugamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 18/446,736

(22) Filed: Aug. 9, 2023

(65) Prior Publication Data

US 2024/0182021 A1 Jun. 6, 2024

(30) Foreign Application Priority Data

Oct. 19, 2022 (JP) .................................. 2022-167408

(51) Int. Cl.
| | | |
|---|---|---|
| *B60W 30/09* | (2012.01) | |
| *B60W 30/095* | (2012.01) | |
| *B60W 30/12* | (2020.01) | |
| *B60W 50/16* | (2020.01) | |
| *B62D 15/02* | (2006.01) | |

(52) U.S. Cl.
CPC .......... *B60W 30/09* (2013.01); *B60W 30/095* (2013.01); *B60W 30/0956* (2013.01); *B60W 30/12* (2013.01); *B60W 50/16* (2013.01); *B62D 15/0265* (2013.01); *B60W 2540/18* (2013.01); *B60W 2710/202* (2013.01)

(58) Field of Classification Search
CPC .... B62D 15/025; B62D 15/0265; B62D 6/00; B60W 30/09; B60W 30/095; B60W 30/0956; B60W 30/12; B60W 50/16
USPC ........................................................... 701/45
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,321,484 B2* | 4/2016 | Morotomi | B62D 6/002 |
| 9,327,765 B2* | 5/2016 | Takeda | B62D 6/04 |

(Continued)

FOREIGN PATENT DOCUMENTS

| | | |
|---|---|---|
| JP | 2015-093569 A | 5/2015 |
| JP | 2019-209844 A | 12/2019 |

(Continued)

*Primary Examiner* — Phutthiwat Wongwian
*Assistant Examiner* — Brian R Kirby
(74) *Attorney, Agent, or Firm* — SoraIP, Inc.

(57) ABSTRACT

A control device for a vehicle configured to execute a first control for outputting a steering torque based on a predetermined first gain and a second control for outputting a steering torque based on a predetermined second gain different from the first gain, wherein during execution of the first control, a predicted start time, which is a predicted time until the start condition of the second control is satisfied, is calculated, and when the start predicted time satisfies the predetermined condition, a reduction control for bringing the output steering torque of the first control closer to 0 is executed before starting the second control.

6 Claims, 5 Drawing Sheets

(56) References Cited

U.S. PATENT DOCUMENTS

| | | |
|---|---|---|
| 9,714,034 B2 | 7/2017 | Otake et al. |
| 9,880,558 B2 | 1/2018 | Nakamura |
| 9,902,399 B2 | 2/2018 | Torii et al. |
| 10,345,443 B2 | 7/2019 | Masui et al. |
| 10,611,240 B2 | 4/2020 | Masui et al. |
| 11,352,058 B2 * | 6/2022 | Hayashi ............... B62D 15/025 |
| 2003/0060936 A1 * | 3/2003 | Yamamura ......... B62D 15/0265 348/148 |
| 2003/0078712 A1 * | 4/2003 | Shimakage ............ B62D 1/286 701/41 |
| 2009/0024279 A1 * | 1/2009 | Takeda .................. B62D 6/008 701/41 |
| 2009/0048738 A1 * | 2/2009 | Iwazaki .................. B62D 1/28 701/44 |
| 2010/0138112 A1 * | 6/2010 | Suzuki ................ B62D 15/025 701/42 |
| 2013/0190988 A1 * | 7/2013 | Limpibunterng ...... B62D 5/008 701/42 |
| 2015/0210318 A1 * | 7/2015 | Takeda .................. B62D 6/008 701/41 |
| 2016/0001811 A1 * | 1/2016 | Endo ....................... B62D 6/10 701/41 |
| 2016/0114832 A1 * | 4/2016 | Taniguchi ............... B62D 6/04 701/41 |
| 2017/0066475 A1 * | 3/2017 | Kudo ....................... B62D 6/10 |
| 2017/0066476 A1 * | 3/2017 | Kudo ................... B62D 5/0463 |
| 2017/0088167 A1 * | 3/2017 | Fujii ...................... B62D 1/286 |
| 2018/0015947 A1 * | 1/2018 | Akatsuka ............... B62D 6/008 |
| 2018/0086341 A1 * | 3/2018 | Taniguchi .............. B62D 6/008 |
| 2018/0201318 A1 * | 7/2018 | Kataoka ............... G06V 20/588 |
| 2019/0367082 A1 * | 12/2019 | Sugamoto ........... B60W 50/087 |
| 2020/0023884 A1 * | 1/2020 | Mizoo ................. B60W 30/095 |
| 2020/0207341 A1 * | 7/2020 | Inoue ............. B60W 30/18145 |
| 2021/0309292 A1 * | 10/2021 | Suzuki ................... B62D 6/008 |

FOREIGN PATENT DOCUMENTS

| | | | |
|---|---|---|---|
| JP | 2020-185920 A | 11/2020 | |
| WO | WO-2006081936 A1 * | 8/2006 | ............ B60T 8/1755 |
| WO | WO-2011161535 A1 * | 12/2011 | ........... B62D 15/025 |

* cited by examiner

CONTROL DEVICE FOR VEHICLE AND CONTROL METHOD FOR VEHICLE

CROSS-REFERENCE TO RELATED APPLICATION

This application claims priority to Japanese Patent Application No. 2022-167408 filed on Oct. 19, 2022, incorporated herein by reference in its entirety.

BACKGROUND

1. Technical Field

The present disclosure relates to a control device and a control method for a vehicle.

2. Description of Related Art

Japanese Unexamined Patent Application Publication No. 2019-209844 (JP 2019-209844 A) discloses a driving assistance device that predicts the amount of operation of the driver according to the external environment, calculates the amount of deviation from the actual amount of operation of the driver, and changes a reaction force characteristic of the operation unit to a reaction force characteristic corresponding to the amount of deviation to optimize the amount of operation of the driver.

SUMMARY

In a driving assistance device capable of executing a plurality of steering controls as driving assistance, there is a case where the steering control being executed is switched to another steering control. In general, since the plurality of steering controls has different objectives, the steering angle followability with respect to the target steering angle is also different. Therefore, when the steering control being executed is switched to another steering control having a different steering angle followability, there is a problem in that the steering torque suddenly changes with the switching of the control, thereby giving a sense of discomfort to the occupant of the vehicle including the driver.

An object of the present disclosure is to provide a technique capable of effectively suppressing fluctuations in steering torque caused by switching of control.

The present disclosure is a control device and a control method for a vehicle, the control device and the control method being able to execute first control for outputting a steering torque based on a predetermined first gain and second control for outputting a steering torque based on a predetermined second gain that differs from the first gain. During execution of the first control, a start prediction time that is a predicted time until a start condition of the second control is satisfied is calculated, and when the start prediction time satisfies a predetermined condition, before starting the second control, degeneracy control for bringing an output steering torque of the first control close to zero is executed.

According to the control device and the control method described above, when the steering control is switched to the second control whose gain is different from the first control during the execution of the first control, the degeneracy control for bringing the output steering torque of the first control closer to 0 is executed before the start of the second control. As a result, it is possible to effectively suppress fluctuations in the steering torque caused by switching of the control, and it is possible to effectively suppress giving an uncomfortable feeling to the occupant of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle control device and a control method according to the present embodiment will be described with reference to the drawings.

Hardware Configuration

Figure 1:
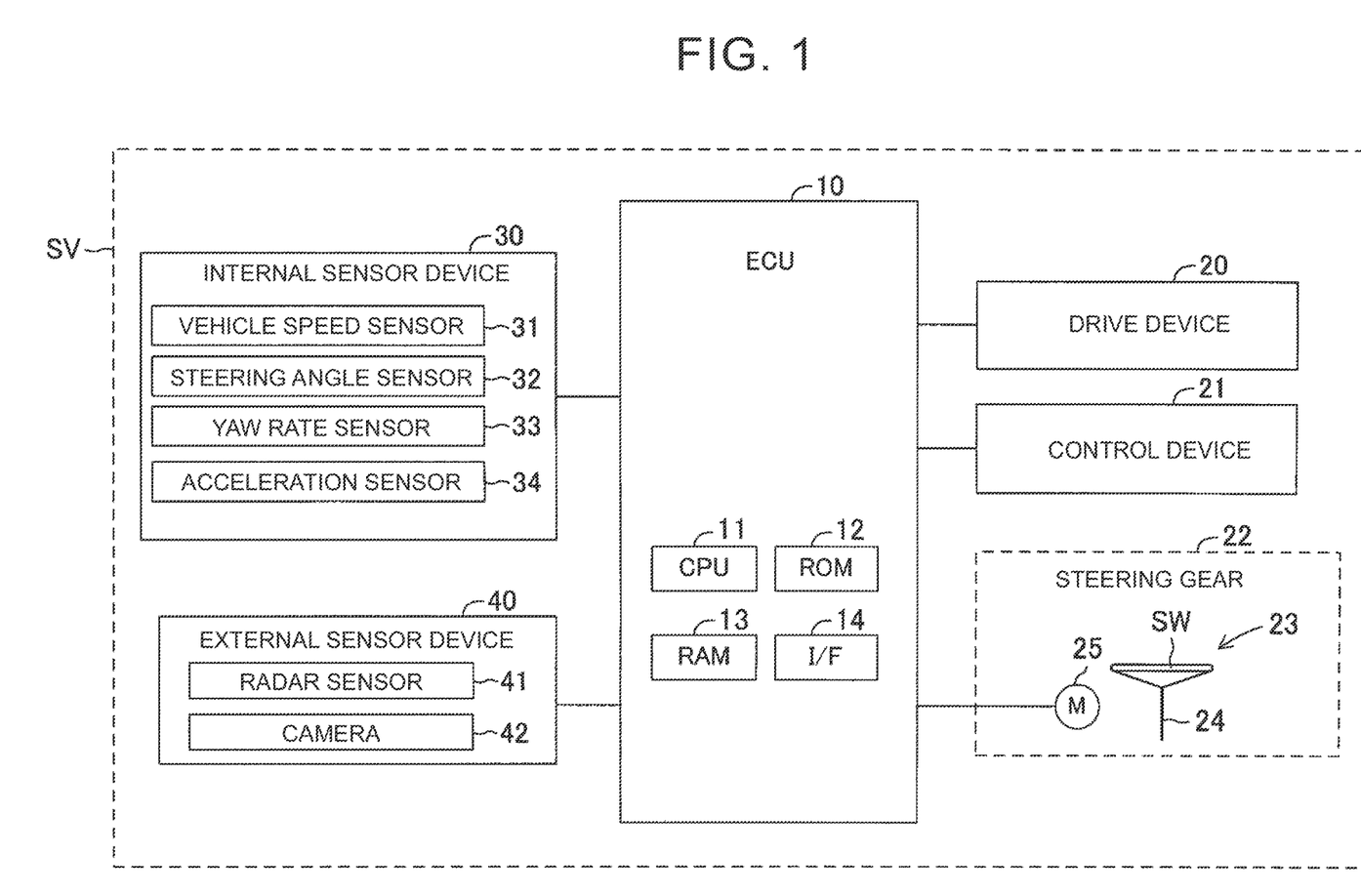
FIG. 1 is a schematic diagram illustrating a hardware configuration of a vehicle according to the present embodiment.

FIG. 1 is a schematic diagram illustrating a hardware configuration of a vehicle SV to which a control device according to the present embodiment is applied.

The vehicle SV has an Electronic Control Unit (ECU) 10. ECU 10 includes a Central Processing Unit (CPU) 11, Read Only Memory (ROM) 12, Random Access Memory (RAM) 13, an interface device 14, and the like. CPU 11 is a processor that executes various programs stored in ROM 12. ROM 12 is a non-volatile memory that stores data and the like required for CPU 11 to execute various programs. RAM 13 provides a working area to be deployed when various programs are executed by CPU 11. The interface device 14 is a communication device for communicating with an external device.

ECU 10 is a central device that supports driving by a driver of a vehicle SV. ECU 10 can execute the normal support mode in which the degree of the steering intervention is relatively small and the avoidance support mode in which the degree of the steering intervention is relatively large as the driving assistance, and can switch between the normal support mode and the avoidance support mode.

The normal support mode is a mode in which driver-based driving support is performed. In the present embodiment, the reaction force control for changing the reaction force characteristic of the steering operation unit is performed so that the steering operation amount of the driver becomes an appropriate operation amount. The avoidance support mode is a mode in which the system-based driving support is performed. In the present embodiment, a Lane Departure Alert Control (hereinafter, referred to as LDA control) is performed to suppress the vehicle SV from deviating from the travel lane. The reaction force control and LTA control will be described later.

A drive device 20, a braking device 21, a steering device 22, an internal sensor device 30, an external sensor device 40, and the like are communicably connected to ECU 10.

The driving device 20 generates a driving force to be transmitted to the driving wheels of the vehicle SV. Examples of the drive device 20 include an electric motor and an engine. In the present embodiment, the vehicle SV may be any of a hybrid electric vehicle (HEV), a plug-in hybrid vehicle (PHEV), a fuel cell electric vehicle (FCEV), a battery electric vehicle (BEV), and an engine-driven vehicle. The braking device 21 applies a braking force to the wheels of the vehicle SV.

The steering device 22 applies a steering force to the wheels of the vehicle SV. The steering device 22 may be either a rack-and-pinion type or a steering-by-wire type. The steering device 22 includes a steering operation unit 23 including a steering wheel SW and the like. Further, the steering device 22 includes a steering motor 25 that applies steering torque to the steering shaft 24. The steering motor 25 generates a steering torque in response to a command from ECU 10. This steering torque can steer the left and right steered wheels of the vehicle SV, and furthermore, it is possible to apply a reaction force to the steering wheel SW against the driver's manipulation. Note that the steering operation unit 23 is not limited to the steering wheel SW, and may be shaped other than a wheel, such as a steering rod.

The internal sensor device 30 is a sensor that detects the condition of the vehicle SV. Specifically, the internal sensor device 30 includes a vehicle speed sensor 31, a steering angle sensor 32, a yaw rate sensor 33, an acceleration sensor 34, and the like.

The vehicle speed sensor 31 detects a traveling speed (vehicle speed V) of the vehicle SV. The steering angle sensor 32 detects a rotational angle of a steering wheel or a steering shaft (not shown) of the vehicle SV, that is, a steering angle. The yaw rate sensor 33 detects the yaw rate of the vehicle SV. The acceleration sensor 34 detects an acceleration of the vehicle SV. The internal sensor device 30 transmits the condition of the vehicle SV detected by the sensors 31 to 34 to ECU 10 at a predetermined cycle.

The external sensor device 40 is a sensor or the like that recognizes target information related to a target in the vicinity of SV. Specifically, the external sensor device 40 includes a radar sensor 41, a camera sensor 42, and the like. Here, the target information includes, for example, a surrounding vehicle, a dividing line such as a white line drawn on a road surface, a curb, a guardrail, a wall, and the like. The external sensor device 40 repeatedly transmits the acquired target object data to ECU 10 every time a predetermined period elapses.

The radar sensor 41 is provided, for example, at a front portion of the vehicle SV, and detects a target present in a front area of the vehicle SV. The radar sensor 41 includes a millimeter wave radar and/or a lidar. The millimeter wave radar emits a millimeter wave and receives a millimeter wave (reflected wave) reflected by a target object existing in a radiation range. The millimeter wave radar acquires the relative distance between the vehicle SV and the target, the relative velocity between the vehicle SV and the target, and the like based on the phase difference between the transmitted millimeter wave and the received reflected wave, the attenuation level of the reflected wave, the time from the transmission of the millimeter wave until the reception of the reflected wave, and the like. The lidar sequentially scans pulsed laser beams having a shorter wavelength than millimeter waves toward a plurality of directions, and receives the reflected light reflected by the targets, thereby obtaining shapes of the targets detected in front of the vehicle SV, relative distances between the vehicle SV and the targets, relative velocities between the vehicle SV and the targets, and the like.

The camera sensor 42 is, for example, a stereo camera or a monocular camera, and a digital camera having an image sensor such as a CMOS or a CCD can be used. The camera sensor 42 is disposed, for example, on an upper portion of a windshield glass of a vehicle SV. The camera sensor 42 captures an image in front of the vehicle SV and processes the captured image-data to acquire target information in front of the vehicle SV. The target information is information indicating a type of a target detected in front of the vehicle SV, a relative distance between the vehicle SV and the target, a relative velocity between the vehicle SV and the target, and the like. The type of the target may be recognized by machine learning such as pattern matching, for example.

Software Configuration

Figure 2:
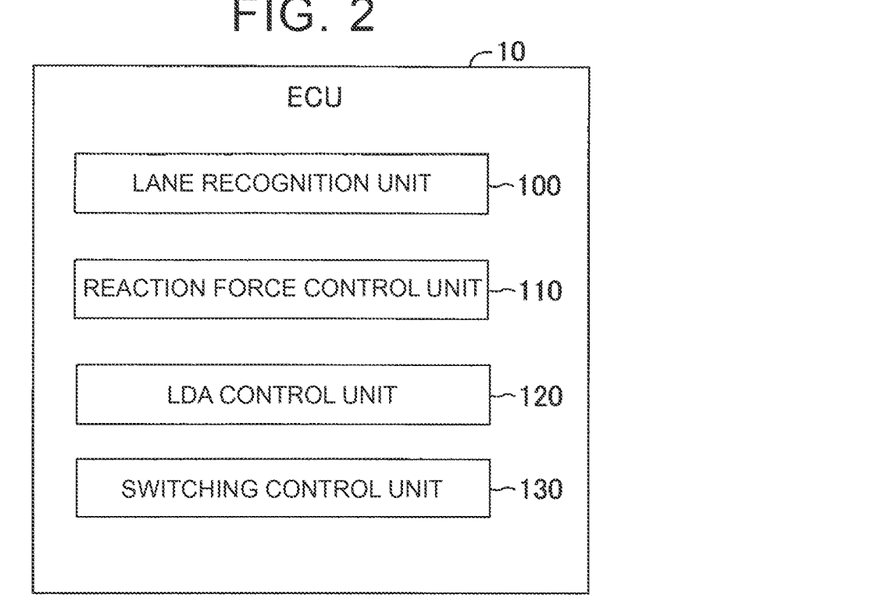
FIG. 2 is a schematic diagram illustrating a software configuration of the control device according to the present embodiment.

FIG. 2 is a schematic diagram illustrating a software configuration of ECU 10 according to the present embodiment. As illustrated in FIG. 2, ECU 10 includes a lane-recognizing unit 100, a reaction force control unit 110, a LDA control unit 120, a switching control unit 130, and the like as functional elements. These functional elements 100 to 130 are realized by CPU 11 of ECU 10 reading a program stored in ROM 12 into a RAM 13 and executing the program. It should be noted that although the functional elements 100 to 130 are described as being included in an ECU 10 which is integral hardware in the present embodiment, any one of them may be provided in another ECU separate from ECU 10. In addition, all or a part of the functional elements 100 to 130 of ECU 10 may be provided in an information processing device of a facility (for example, a managing center) capable of communicating with the vehicle SV.

The lane recognition unit 100 recognizes the traveling lane in which the vehicle SV is traveling, based on the detection result of the external sensor device 40. Here, the traveling lane refers to a traveling area defined by a structure such as a curbstone, a guardrail, or a wall as well as a dividing line such as a white line or a yellow line drawn on a road surface. In the following description, for the sake of convenience, the boundary of the traveling region defined by the dividing lines, structures, and the like is referred to as a "boundary line".

Figure 3:
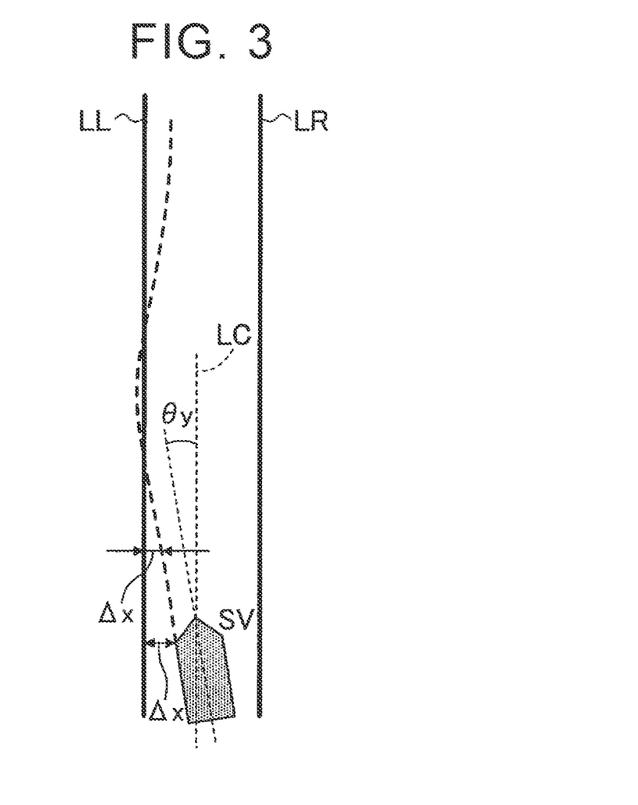
FIG. 3 is a schematic diagram illustrating travel lane information.

As illustrated in FIG. 3, the lane recognition unit 100 recognizes the left boundary line LL and the right boundary line LR. Further, the lane recognition unit 100 calculates the curve radius R of the center line LC that is the center position of the left and right boundary lines LL, LR, and calculates the deviation angle θy (yaw angle θy) between the direction of the center line LC and the direction in which the vehicle SV is directed. Further, the lane recognition unit 100 calculates a distance (hereinafter, referred to as a lateral deviation Δx) between the left front wheel and the left boundary line LL of the vehicle SV and between the right front wheel and the right boundary line LR. FIG. 3 shows only the lateral deviation Δx between the left front wheel and the left boundary line LL. In this case, there are two lateral deviations Δx. In LDA control described later, the lateral deviation Δx in the direction in which SV of vehicles is estimated to deviate from the traveling lane, that is, the direction indicated by the yaw angle θy may be used. Hereinafter, the lateral deviation Δx, the yaw angle θy, and the curve radius R calculated by the lane recognition unit 100 are also collectively referred to as traveling lane information.

When the driving support is the normal support mode, the reaction force control unit 110 executes reaction force control for changing the reaction force property of the steering operation unit 23 so that the operation quantity of the steering wheel SW of the driver becomes appropriate while maintaining the driver's main sensation. The reaction force characteristic is a characteristic of the reaction force applied from the steering motor 25 to the steering shaft 24 in accordance with the manipulated variable of the driver with respect to the steering wheel SW.

The reaction force control unit 110 predicts an appropriate operation amount of the driver based on the detection result of the internal sensor device 30 and the traveling lane information acquired by the lane recognition unit 100. The proper manipulation amount is a manipulation amount of the steering wheel SW that is normally performed by the driver in response to conditions around the vehicle SV. The reaction force control unit 110 compares the predicted proper operation amount with the actual operation amount (actual operation amount) of the driver. The operation amount of the driver may be acquired based on the detection result of the steering angle sensor 32.

When the actual operation amount is an appropriate operation amount, the reaction force control unit 110 maintains the reaction force characteristic of the steering operation unit 23 at a predetermined reference reaction force characteristic. On the other hand, when the actual operation amount is not the proper operation amount, the reaction force control unit 110 changes the reaction force characteristic of the steering operation unit 23 from the reference reaction force characteristic to the main body feeling maintaining reaction force characteristic. The main body feeling maintaining reaction force characteristic is a reaction force characteristic that makes the actual operation amount easily stay at an appropriate operation amount while maintaining the main body feeling of the driver, and can be set by a minute change from the reference reaction force characteristic. As an example, the reaction force maintaining reaction force characteristic can be set by making the reaction force change amount when the actual operation amount is in the proper operation amount larger than the reaction force change amount when the actual operation amount is deviating from or is likely to deviate from the proper operation amount.

When the reaction force characteristic is changed to the main body feeling maintaining reaction force characteristic, the reaction force control unit 110 calculates a target steering angle of the reaction force control (hereinafter, the reaction force target steering angle σA) based on the main body feeling maintaining reaction force characteristic. Further, the reaction force control unit 110 calculates the reaction force support torque τSA (=τA(σA−σD)) by multiplying the steering angle difference Δσ between the reaction force target steering angle σA and the actual steering angle σD acquired by the steering angle sensor 32 by a predetermined torque gain (hereinafter, referred to as reaction torque gain τA). Further, the reaction force control unit 110 transmits a command signal including information indicating the reaction force support torque τSA to the steering device 22. Accordingly, the reaction force support torque τSA is transmitted from the steering motor 25 to the steering shaft 24, and a desired reaction force is applied to the steering wheel SW.

LDA control unit 120 executes LDA control for suppressing a deviation of the vehicle SV from the traveling lane when the vehicle SV is likely to deviate from the traveling lane. LDA control unit 120 calculates a target steering angle of LDA control (hereinafter, referred to as a LDA target steering angle σB) based on the travel lane information (Δx, θY, R) acquired by the lane recognition unit 100. LDA target steering angle σB is a steering angle that is set so that the vehicle SV does not deviate outward in the boundary line LL, LR.

LDA control unit 120 determines whether LDA starting condition is satisfied. LDA starting condition may be, for example, a case where the predicted arrival time TR until the vehicle SV reaches the boundary line LL, LR becomes shorter than the predetermined threshold time Tv (TR<Tv). The predicted arrival-time TR can be determined based on Equation (1) below, which assumes that the vehicle SV performs isoaccelerated linear motion until reaching the boundary line LL, LR.

Mathematical Formula 1

$$TR = \frac{-\frac{d\Delta x}{dt} \pm \sqrt{\left(\frac{d\Delta x}{dt}\right)^3 - 2YR \times V \times \Delta x}}{YR \times V} \quad (1)$$

$$\therefore \Delta x = \frac{d\Delta x}{dt} \times TR + \frac{1}{2} \times (YR \cdot V) \times TR \times TR^2$$

In Equation (1), Δx is the lateral deviation, V is the vehicle speed of the vehicle SV, and YR is the yaw rate of the vehicle SV.

When LDA starting condition is satisfied, LDA control unit 120 calculates LDA support torque τSB (=τB(σB−σD)) by multiplying the steering angle difference Δσ between LDA target steering angle σB and the actual steering angle σD acquired by the steering angle sensor 32 by a predetermined torque gain (hereinafter, referred to as a LDA torque gain τB). When LDA support torque TSB is calculated, LDA control unit 120 transmits a command signal including information representing LDA support torque τSB to the steering device 22. As a result, LDA support torque τSB is transmitted from the steering motor 25 to the steering shaft 24, and the steered wheels of the vehicle SV are steered, so that the vehicle SV is prevented from deviating from the traveling lane.

Here, it is assumed that the driving support is switched from the normal support mode to the avoidance support mode, that is, the steering control transitions from the reaction force control to LDA control. The reaction force control is a driver-based driving support that has low steering angle followability with respect to the target steering angle, and LDA control is a system-based driving support that has high steering angle followability with respect to the target steering angle. In general, the smaller the torque gain, the lower the steering angle followability with respect to the target steering angle, and the larger the steering angle difference between the target steering angle and the actual steering angle. On the other hand, as the torque gain increases, the steering angle followability with respect to the target steering angle increases, and the steering angle difference between the target steering angle and the actual steering angle decreases. Therefore, when the steering control is switched from the reaction force control with low steering angle followability to LDA control with high steering angle followability, it is conceivable that the target steering angle is gradually changed and the steering angle is smoothly connected.

Figure 6:
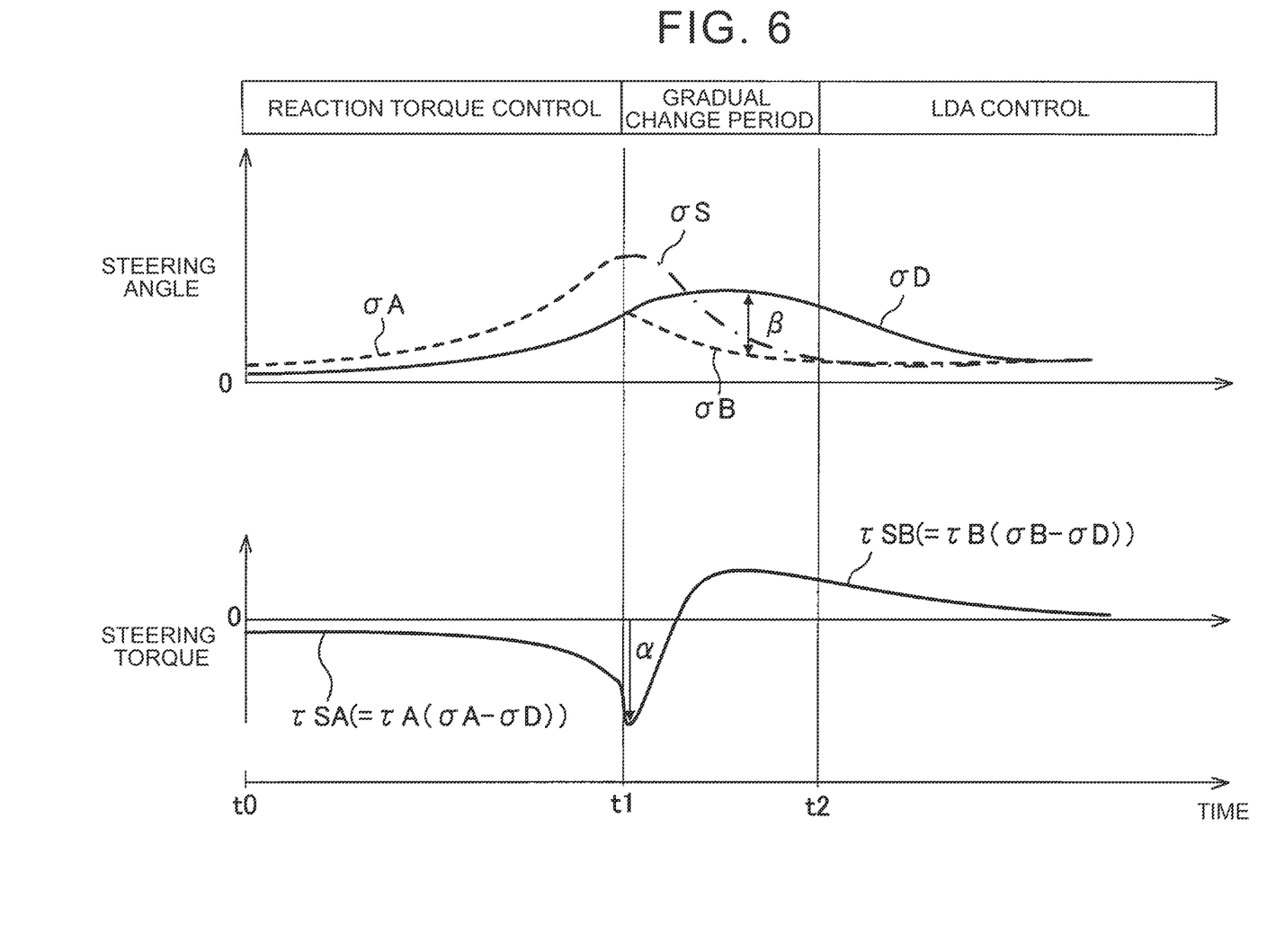
FIG. 6 is a timing chart illustrating the switching control of the comparative example.

FIG. 6 is a timing chart illustrating an exemplary process of smoothly connecting the steering angles when the steering control is switched from the reaction force control to LDA control. FIG. 6 is a comparative example of the present disclosure. From the time t1 in FIG. 6, t2 indicates a gradual change period in which the target steering angle (refer to σS) is gradually changed from the reaction force target steering angle σA toward LDA target steering angle σB in order to smoothly connect the steering angles. Since LDA control has higher steering angle followability than the reaction force control, LDA torque gain τB is larger than the reaction force torque gain τA (τA<τB). Therefore, even if a gradual change period for gradually changing the target steering angle is provided, the output steering torque greatly changes from the reaction force support torque τSA (=τA (σA−σD)) to LDA support torque τSB (=τB (σB−σD)) before and after the switching of the control, so that a sudden torque change occurs (refer to α in FIG. 6). When a sudden torque change occurs, there is a problem that an occupant including a driver feels uncomfortable or uncomfortable. In addition, there is also a problem that LDA target steering angle σB indicated by a broken line in FIG. 6 greatly deviates from the actual steering angle σD, thereby deteriorating the steering angle followability of LDA control (see β in FIG. 6).

Therefore, the switching control unit 130 of the present embodiment performs the pre-degeneracy control of bringing the reaction force support torque τSA closer to 0 (zero) prior to switching the reaction force control to LDA control, so as to suppress the torque sudden change caused by the switching of the control. Details of the pre-degeneracy control will be described below based on a timing chart shown in FIG. 4.

Figure 4:
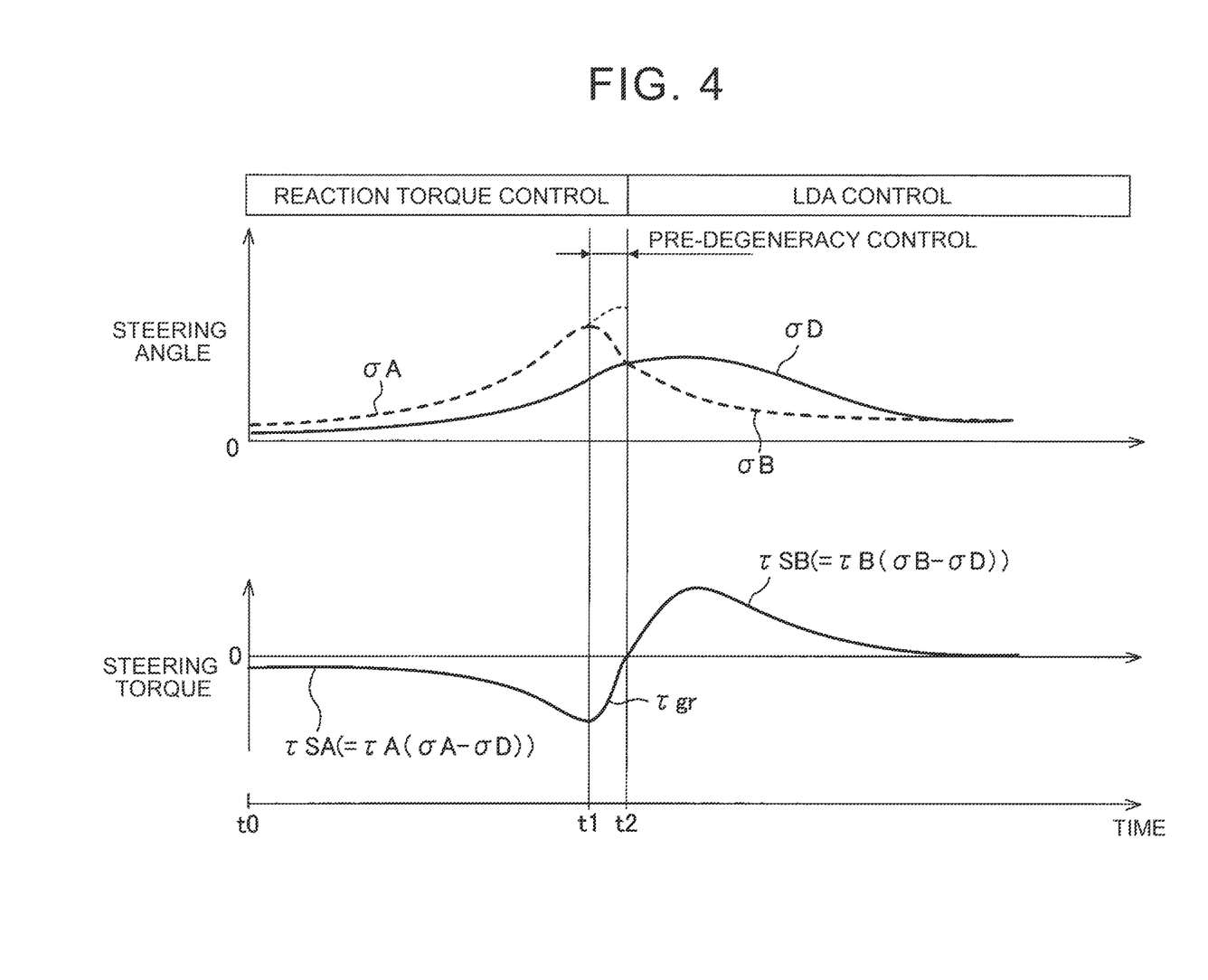
FIG. 4 is a timing chart illustrating the switching control according to the present embodiment.

In the time t0 of FIG. 4, it is assumed that the driving support is the normal support mode and the reaction force control is executed. During the execution of the reaction force control, the switching control unit 130 repeatedly calculates the steering angle difference Δσ between the reaction force target steering angle σA and the actual steering angle σD at a predetermined cycle. Further, the switching control unit 130 repeatedly calculates a predicted time (hereinafter, referred to as a "start prediction time TB") from the present time until the start condition of LDA control is satisfied at a predetermined cycle. The start prediction time TB is a time from the present time until the predicted arrival time TR becomes shorter than the threshold time Tv.

The switching control unit 130 calculates a prediction time (hereinafter, referred to as a degeneracy prediction time Td) required to bring the present reaction force support torque τSA to approximately 0 (zero) based on the preset torque gradually decreasing gradient τgr. The torque decreasing gradient τgr is a torque change rate (change amount per unit time) that gradually decreases the reaction force support torque τSA to 0 (zero), and is set based on a value that does not give a driver a sense of discomfort or minimizes a sense of discomfort. The torque decreasing gradient τgr may be a fixed value or may be a variable value corresponding to the steering angle difference Δσ.

The switching control unit 130 calculates the degeneracy prediction time TD (=Δσ/τgr) by dividing the steering angle difference Δσ by the torque gradually decreasing gradient τgr. The switching control unit 130 determines whether or not the degeneracy prediction time TD is equal to or greater than the start prediction time TB. The switching control unit 130 starts the pre-degeneracy control from the time t1 when the degeneracy prediction time TD becomes equal to or larger than the start prediction time TB at t1 (TD≥TB).

The switching control unit 130 determines whether or not the steering angle difference Δσ becomes 0 (zero) by executing the pre-degeneracy control. At the time t2, when the steering angle difference Δσ becomes 0 (zero), and accordingly, the reaction force support torque τSA also becomes approximately 0 (zero), the switching control unit 130 ends the pre-degeneracy control. At the same time, the switching control unit 130 starts LDA control, that is, switches the steering control from the reaction force control to LDA control. As described above, by starting LDA control while the reaction force support torque τSA is approximately 0 (zero), even when the steering angle followability (torque gains τA and τB) of the reaction force control and LDA control differ, the generation of torque fluctuation due to the switching can be effectively suppressed. In addition, by starting LDA control from a condition in which the steering angle difference Δσ is 0 (zero), the steering angle followability of LDA control can be effectively ensured. Further, as long as the time until the reaction force support torque τSA reaches approximately 0 (zero) remains, the reaction force control can be continued to ensure the maximum operation time of the reaction force control.

Figure 5:
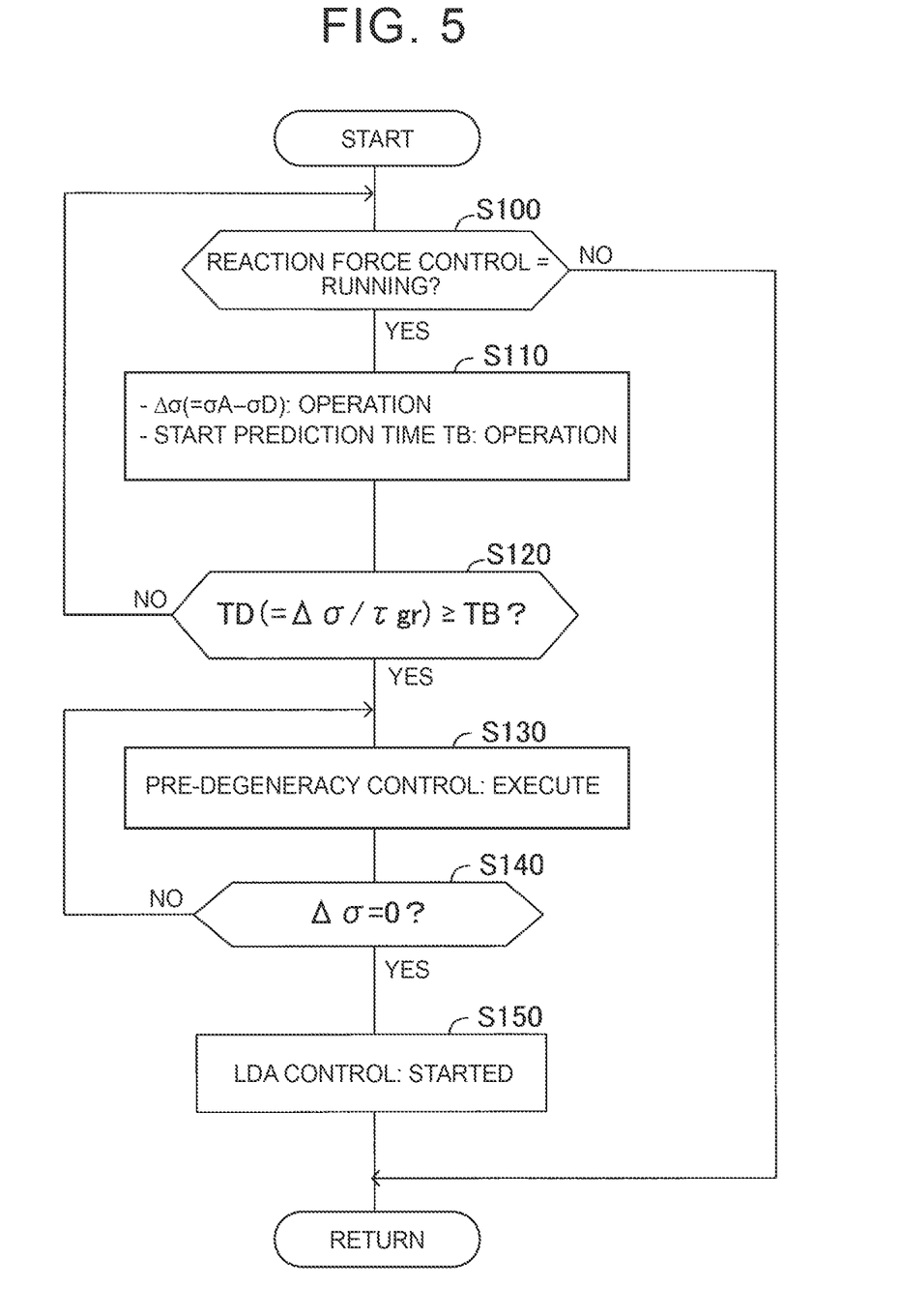
FIG. 5 is a flowchart illustrating a routine of switching control according to the present embodiment.

FIG. 5 is a flow chart for explaining a routine of switching control by CPU 11 of an ECU 10. This routine is started by executing the reaction force control.

In S100, ECU 10 determines whether or not the reaction force control is being executed. If the reaction force control is being executed (Yes), ECU 10 proceeds to S110 process. On the other hand, when the reaction force control is not being executed (No), ECU 10 returns this routine.

In S110, ECU 10 calculates a steering angle difference Δσ between the reaction force target steering angle σA and the actual steering angle σD, and calculates a start prediction time TB from the present time until the start condition of LDA control is satisfied. Next, in S120, ECU 10 determines whether or not the degeneracy prediction time TD (=Δσ/τgr) obtained by dividing the steering angle difference Δσ by the torque gradual decreasing gradient τgr becomes equal to or larger than the start prediction time TB. If the degeneracy prediction time TD becomes equal to or greater than the start prediction time TB (Yes), ECU 10 proceeds to S130 process. On the other hand, when the degeneracy prediction time TD is shorter than the start prediction time TB (No), ECU 10 returns to S100 determination process.

In S130, ECU 10 executes a pre-degeneracy control for bringing the reaction force support torque τSA close to approximately 0 (zero) based on the torque gradual decreasing gradient τgr. Then, in S140, ECU 10 determines whether or not the steering angle difference Δσ becomes 0 (zero) by executing the pre-degeneracy control. If the steering angle difference Δσ is not 0 (No), ECU 10 returns to S130 process and continues the pre-degeneracy control. On the other hand, when the steering angle difference Δσ becomes 0 (Yes), ECU 10 proceeds to S150 process and starts LDA control. ECU 10 then returns the routine.

Although the control device and the control method of the vehicle according to the present embodiment have been described above, the present disclosure is not limited to the above-described embodiment, and various modifications can be made without departing from the object of the present disclosure.

For example, in the above-described embodiment, the switching control unit 130 executes the pre-degeneration control when the driving support is switched from the normal support mode to the avoidance support mode, that is, when the steering control is shifted from the reaction force control to LDA control, but can also execute the pre-degeneration control when the driving support is switched from the avoidance support mode to the normal support mode, that is, when the steering control is shifted from LDA control to the reaction force control. In this case, too, it is possible to suppress the sudden torque change (sudden decrease) caused by the switching of the control, and it is possible to effectively prevent the driver from feeling uncomfortable.

Further, the avoidance support mode is not limited to LDA control, and may be another steering control with a relatively large degree of steering intervention, such as lane-keeping support control (LTA control) and steering avoidance control (PCS control).

Further, the application of the present disclosure is not limited to the steering control, and can also be applied to a case where two or more controls having different gains are switched to one actuator in the control of a general actuator such as a powertrain. Examples of such control include control for switching the regenerative braking force of the electric motor to a stronger braking force.

The vehicle SV may be a vehicle capable of switching between automated driving and manual driving. In this case, the control of the present disclosure may be executed during the manual operation.

What is claimed is:

1. A control device for a vehicle comprising a processor configured to execute first control that outputs a first steering torque based on a first gain and second control that outputs a second steering torque based on a second gain that differs from the first gain, wherein
    during execution of the first control, the processor is configured to
        repeatedly calculate a first time that is a predicted time until a start condition of the second control is satisfied,
        repeatedly calculate a second time that is a predicted time over which the first steering torque reduced to zero at a predetermined gradient, and
        determine whether the second time becomes equal to or longer than the first time,
    the processor is configured to keep executing the first control in a case where the processor determines that the second time is shorter than the first time, and
    the processor is configured to
        decrease the first steering torque close to zero at the predetermined gradient in a case where the processor determines that the second time becomes equal to or longer than the first time,
        acquire a steering angle difference between a target steering angle and an actual steering angle,
        determine whether the steering angle difference becomes zero, and
        in a case where the processor determines that the steering angle difference becomes zero, execute the second control.

2. The control device according to claim 1, wherein the second gain is larger than the first gain, and the second control is a steering control that has a higher steering angle followability with respect to a target steering angle than the first control.

3. The control device according to claim 1, wherein
    the first control is a reaction force control for predicting an appropriate operation amount for a steering operation unit of a driver in accordance with a situation around the vehicle, setting an appropriate operation range including the appropriate operation amount, and changing a reaction force characteristic of the steering operation unit such that an operation amount of the driver is within the appropriate operation range, and
    the second control is any one of a lane deviation suppression control for suppressing a deviation from a traveling lane of the vehicle, a lane maintenance support control for maintaining the vehicle in a traveling lane, and a steering avoidance support control for avoiding a collision between the vehicle and an obstacle.

4. A control method for a vehicle, the control method comprising:
    executing first control that outputs a first steering torque based on a first gain;
    during execution of the first control,
        repeatedly calculating a first time that is a predicted time until a start condition of a second control is satisfied,
        repeatedly calculating a second time that is a predicted time over which the first steering torque reduced to zero at a predetermined gradient, and
        determining whether the second time becomes equal to or longer than the first time,
    in a case where the second time is shorter than the first time, keep executing the first control; and
    in a case where the second time becomes equal to or longer than the first time,
        decreasing the first steering torque close to zero at the predetermined gradient,
        acquiring a steering angle difference that is a difference between a target steering angle and an actual steering angle,
        determining whether the steering angle difference becomes zero, and
        in a case where the steering angle difference becomes zero, executing the second control that outputs a second steering torque based on a second gain that differs from the first gain.

5. The control device according to claim 1, wherein
    during the first control, the processor is configured to repeatedly calculate a third time that is a predicted time until the time for the vehicle to reach a boundary line of a driving lane,
    the start condition of the second control will be satisfied in a case where the third time becomes shorter than a threshold, and
    the first time is the predicted time until the third time becomes shorter than the threshold.

6. The control device according to claim 1, wherein
    the predetermined gradient is a torque change amount per unit time and set based on a value that does not give a driver a sense of discomfort.

* * * * *